United States Patent
Hannah et al.

(10) Patent No.: US 6,618,005 B2
(45) Date of Patent: Sep. 9, 2003

(54) DETERMINING WIRELESS DEVICE LOCATIONS

(75) Inventors: Eric C. Hannah, Pebble Beach, CA (US); David L. Tennenhouse, Hillsborough, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/896,772

(22) Filed: Jun. 29, 2001

(65) Prior Publication Data

US 2003/0001776 A1 Jan. 2, 2003

(51) Int. Cl.[7] .............................. G01S 5/02; H04B 7/185
(52) U.S. Cl. .............................. 342/357.1; 342/357.06; 701/213
(58) Field of Search .................. 342/357.14, 357.09, 342/357.1, 357.06; 701/213

(56) References Cited

U.S. PATENT DOCUMENTS

| | | | | |
|---|---|---|---|---|
| 5,968,121 A | * | 10/1999 | Logan et al. | 709/219 |
| 6,266,612 B1 | * | 7/2001 | Dussell et al. | 701/207 |
| 6,377,209 B1 | * | 4/2002 | Krasner | 342/357.09 |
| 6,414,635 B1 | * | 7/2002 | Stewart et al. | 342/457 |
| 6,438,363 B1 | * | 8/2002 | Feder et al. | 455/226.4 |
| 6,452,915 B1 | * | 9/2002 | Jorgensen | 370/338 |
| 6,473,032 B1 | * | 10/2002 | Trimble | 342/357.14 |

* cited by examiner

*Primary Examiner*—Theodore M. Blum
(74) *Attorney, Agent, or Firm*—Blakely, Sokoloff, Taylor & Zafman LLP

(57) ABSTRACT

Wireless network devices can obtain their geographical location by triangulating with access points that have precise time information. In response to a location prompt, a wireless device can send a transmission to multiple access points that are within its range. The different times at which the transmission is received at different access points can be collected and forwarded to a server, which can compute the location of the wireless device using triangulation techniques. The access points can calibrate their own time bases from time services received from global position satellites.

23 Claims, 6 Drawing Sheets

DETERMINING WIRELESS DEVICE LOCATIONS

BACKGROUND OF THE INVENTION

1. Field of the Invention

The invention pertains generally to communications. In particular, it pertains to wireless network communications with position-location capabilities.

2. Description of the Related Art

Wireless communications devices have become much more prevalent in the last few years. Cell phones are commonplace, and Internet access through cell phones is increasing in popularity. Wireless laptop computers and related mobile devices are being connected to the Internet through wireless access points in places like airport terminals. These wireless access points have many of the same features as cell phone base stations, such as automated selection of one of the access point within range to handle data communications for a given mobile device, and seamless transfer of this control to a different access point as the mobile device is moved.

Although the Internet provides a great deal of locally interesting information to users, the users must generally know which sites to access to obtain the desired relevant information. Further, 'local' in this context generally means within an entire city, or at least an area of many square miles. When the user is moving around using a wireless mobile device, knowledge of what is available in the immediate vicinity is generally not available, or at least not easily obtainable. This lack of information on what is available to the user in the immediate vicinity can be frustrating to the user of the mobile device. By the same token, businesses may want to inform the user of their commercial facilities that are within the user's vicinity (i.e., a restaurant, vending machine, ATM, etc.), but cannot do so because they don't know where the user is located.

DETAILED DESCRIPTION OF THE INVENTION

Various embodiments of the invention combine mobile wireless devices and their wireless access points with accurate determination of the mobile device's location. This in turn can enable the mobile device's user to locate specific resources that may be in the user's immediate vicinity. It can also enable commercial entities that are in contact with the mobile device through a server to determine where the user is located and notify the user of their services that are available in the user's vicinity. Directions on how to reach that service can also be provided.

Figure 1:
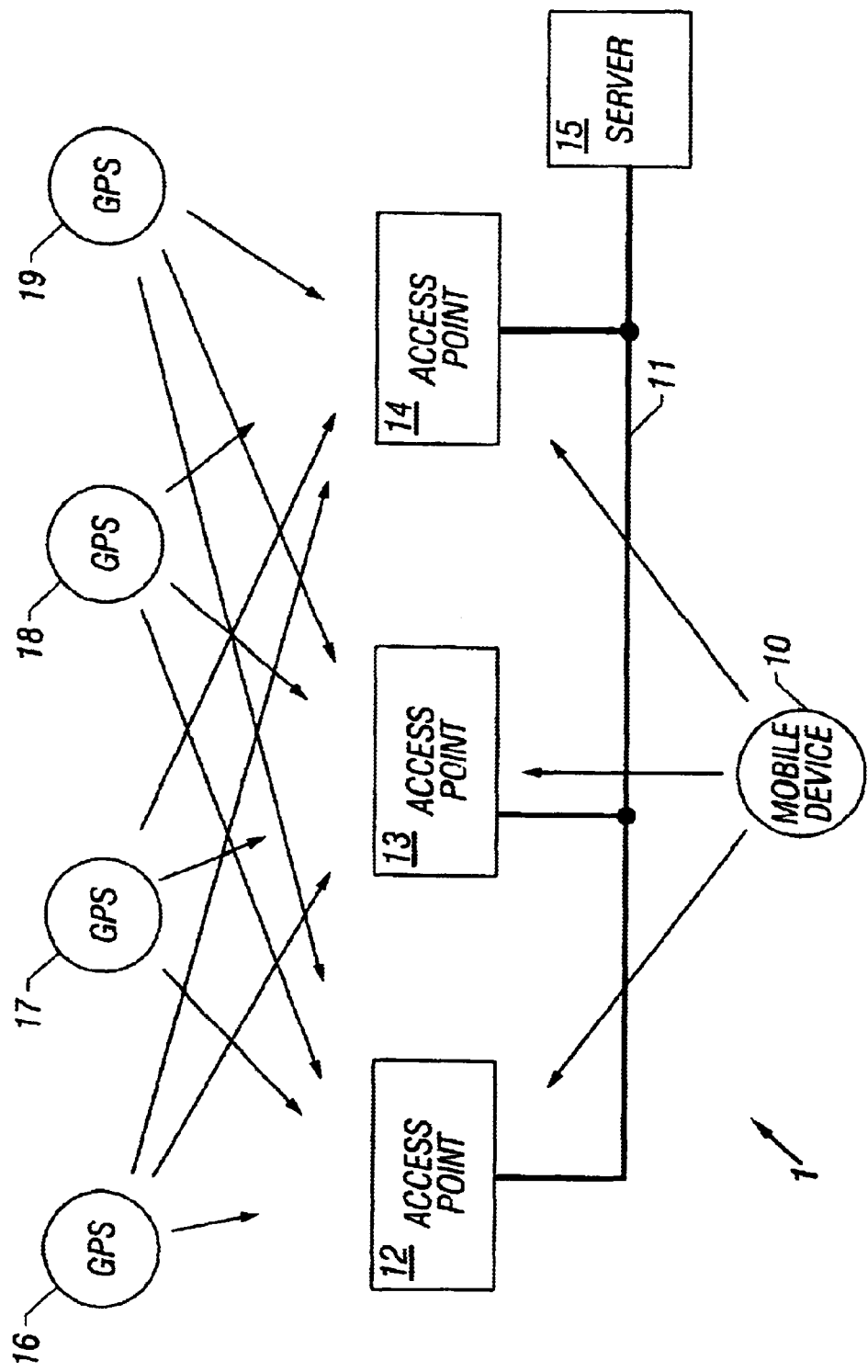
FIG. 1 shows a diagram of a system.

FIG. 1 shows a system diagram. Access points 12, 13 and 14 may be devices that communicate with one or more mobile devices 10 within their range using wireless media such as radio waves, and also communicate with other devices such as server 15 over network 11, which may be made up of one or more communications links. In one embodiment, network 11 is the Internet, and wireless mobile device 10 includes an Internet-compatible device with an Internet browser and a display to present relevant information to a user. Various wireless access points may be scattered throughout the user's area, with several of them being close enough to the user's wireless mobile device 10 to communicate with device 10. FIG. 1 shows three access points 12–14 that meet this requirement, but other quantities of access points may also be used. In one embodiment, electromagnetic signals in the 2.48 gigahertz (GHz) range are used for communications between mobile device 10 and access points 12–14. This structure may be used to facilitate data communications between mobile device 10 and server 15, while allowing mobile device 10 to be physically moved around to various locations. As long as mobile device 10 remains within communication range of at least one access point, the data link between mobile device 10 and server 15 maybe maintained, with primary control of communications with mobile device 10 being passed from one access point to another as mobile device 10 moves from place to place. The access point that has primary control of communications with mobile device 10 at any given time may be referred to as the controlling access point for that particular mobile device.

To determine the location of mobile device 10, its relative distance from each of three or more access points 12–14 may be determined. Common triangulation techniques may then be used to determine the location of the mobile device with respect to those access points. Since wireless access points are generally fixed in place, their location may be determined in advance, and that location may be made easily available. In one embodiment, each access point 12–14 stores is own location and provides that location information to other devices as needed, such as to server 15 over network 11. In another embodiment, the location of each access point may be contained in a database that is stored in a more central location, such as at server 15. The location information may be stored in any useful format. In one embodiment, this format may take the universal global form of latitude/longitude/elevation. Other embodiments may use regional or local coordinate formats. A device may convert between different formats as needed.

To provide a common reference point to determine the location of mobile device 10, the facilities of the satellite-based Global Positioning System (GPS) maybe used. FIG. 1 shows four GPS satellites 16–19 communicating to each of access points 12–14. In one embodiment, wireless access points 12–14 may use the GPS system to determine their own locations. Three GPS satellites may be sufficient to determine location, although four are shown.

To determine the location of mobile device 10, a common timing reference may be used. In one embodiment, the access points may make use of the time services of the GPS system. The access points may have high-precision clocks that are synchronized to each other so that all their clocks show the same time within a specified accuracy, such as within a few nanoseconds. Any circuit delays between the reception of a GPS time signal and the internal clock may be measured and compensated for in the design of the access point.

To provide information for triangulating the location of mobile device 10, mobile device 10 may broadcast a 'ping' signal to the wireless access points 12–14, with each access point receiving the same ping signal. A ping signal may be a transmission with a sharp reference point that can be accurately detected by each access point. In one embodiment, the ping signal is an analog waveform with a precise initiation point, and the initiation point may serve as the reference point. In one embodiment, the ping signal is transmitted to wireless access points 12–14 in response to a request for a ping signal that has been transmitted to mobile device 10 from the controlling access point. When an access point receives the ping signal, it may note at what time the reference point was received. The difference in distance between each access point 12–14 and mobile device 10 may cause each access point 12–14 to detect the reference point at a different time. Since each access point has its clock accurately synchronized with the clocks of the other access points, the difference between the times the reference point was received by the various access points 12–14 may be determined by comparing the ping reception times from the different access points. Since the speed of electromagnetic waves through the air is known, triangulation techniques may then be used to calculate the distance and direction of the mobile device from each of the participating access points. Three access points may provide sufficient information to calculate the location of the mobile device. However, more than three access points may also be used. Accuracy may improve if more than three access points are used in the calculation, since slight inaccuracies in time synchronization may be averaged out. In one embodiment, the ping signal emanates from the mobile device in all directions in 3-dimensional space, and the 3-dimensional location of each access point is known, so the location of mobile device 10 maybe determined in three dimensions. This relative location may be converted into an absolute positional location within a larger reference grid. This relative location may also be converted into local coordinates that are meaningful to the user, such as floor numbers, corridor numbers, and room numbers in a multi-story building.

The calculation of the location of mobile device 10 may be performed in various places. In one embodiment, server 15 receives the ping-reception time from each access point, along with an identification of the associated mobile device 10 that broadcast the ping signal, and server 15 may then calculate the location of mobile device 10 based on the location of each of the access points 12–14 and the time each ping was received by each access point. In one embodiment, data indicating the location of each access point is transmitted, along with the ping reception time, from that access point to the server after the ping signal is received. In another embodiment, the location of each access point is contained in a database that is accessible to the server. In another embodiment, the calculation function takes place in at least one of the access points, and the calculated location of mobile device 10 may then be transmitted to server 15 over network 11. In one embodiment, after the location of the mobile device is determined, the location of the mobile device may be transmitted to the mobile device. This location may be used in other processing performed in the user device. In one embodiment, this information may be presented to the user in a user-friendly format, such as by describing to the user his or her location with respect to easily identifiable landmarks or reference points.

In one embodiment, access points 12–14 may be used both for digital data communication between mobile device 10 and server 15, and for ping reception to determine the location of mobile device 10. In another embodiment, the access point may be used to receive the ping signal and note the time the ping signal is received, while a separate device may be used to handle data communications between mobile device 10 and server 15.

Figure 2:
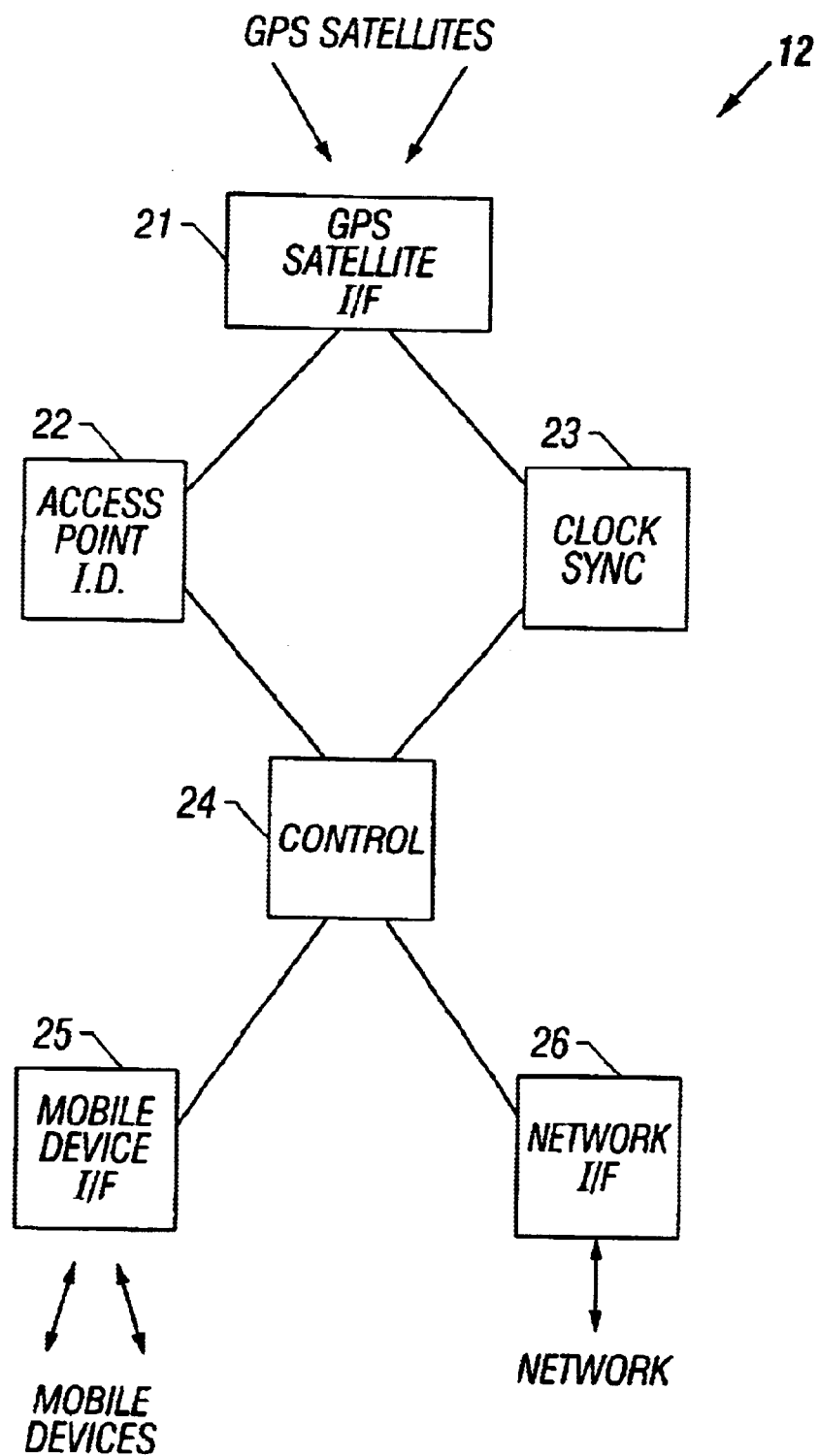
FIG. 2 shows an access point.

FIG. 2 shows a functional block diagram of components of an embodiment of access point 12, which may be representative of other access points. An access point may be a device that provides an interface between one or more wireless mobile devices and one or more servers, and may also provide the time-base capabilities needed to determine a wireless mobile device's location.

GPS satellite interface 21 may receive signals from multiple GPS satellites. If the access point is to determine its own location, then access point identification logic 22 may derive calculation values based on the difference in time of the different signals received from different satellites. These values may be used to calculate the access point's location using triangulation techniques. In one embodiment, the calculations are performed in control logic 24, which includes a processor and memory. Clock synchronization logic 23 may provide a clock signal that is synchronized to the time services clock received through GPS interface 21. Each of multiple access points may have their clock synchronized to each other by synchronizing on the GPS clock signals. The synchronized clock in each access point may include a phase shift adjustment to compensate for the fact that the access points receive their GPS clock signals at slightly different times due the different location at which each access point resides.

Mobile device interface 25 may provide the wireless interface to one or more mobile devices that are communicating with access point 12. In one embodiment, this includes an antenna for transmitting and receiving signals in the 2.48 GHz band. Interface 25 may communicate with multiple mobile devices using well-known techniques. Interface 25 may handle data communications with the mobile devices. In one embodiment, interface 25 may also receive the ping signal and provide that ping signal to control logic 24, which may include logic to compare the reference point of the ping signal with the synchronized clock from clock synchronization logic 23.

Network interface 26 may provide communications with other devices, such as a server, over a network. This network may include any combination of local, regional, national, and international networks. In one embodiment, the network includes the Internet and may be used to provide communications between the mobile devices and one or more servers.

Control logic 24 may be used to connect, monitor, and control the other functional areas of access point 12. Control logic 24 may include a processor, memory, a bus, and other computer resources. Control logic 24 may also include specialized logic to operate with access point identification logic 22, clock synchronization logic 23, mobile device interface 25, and network interface 26.

Figure 3:
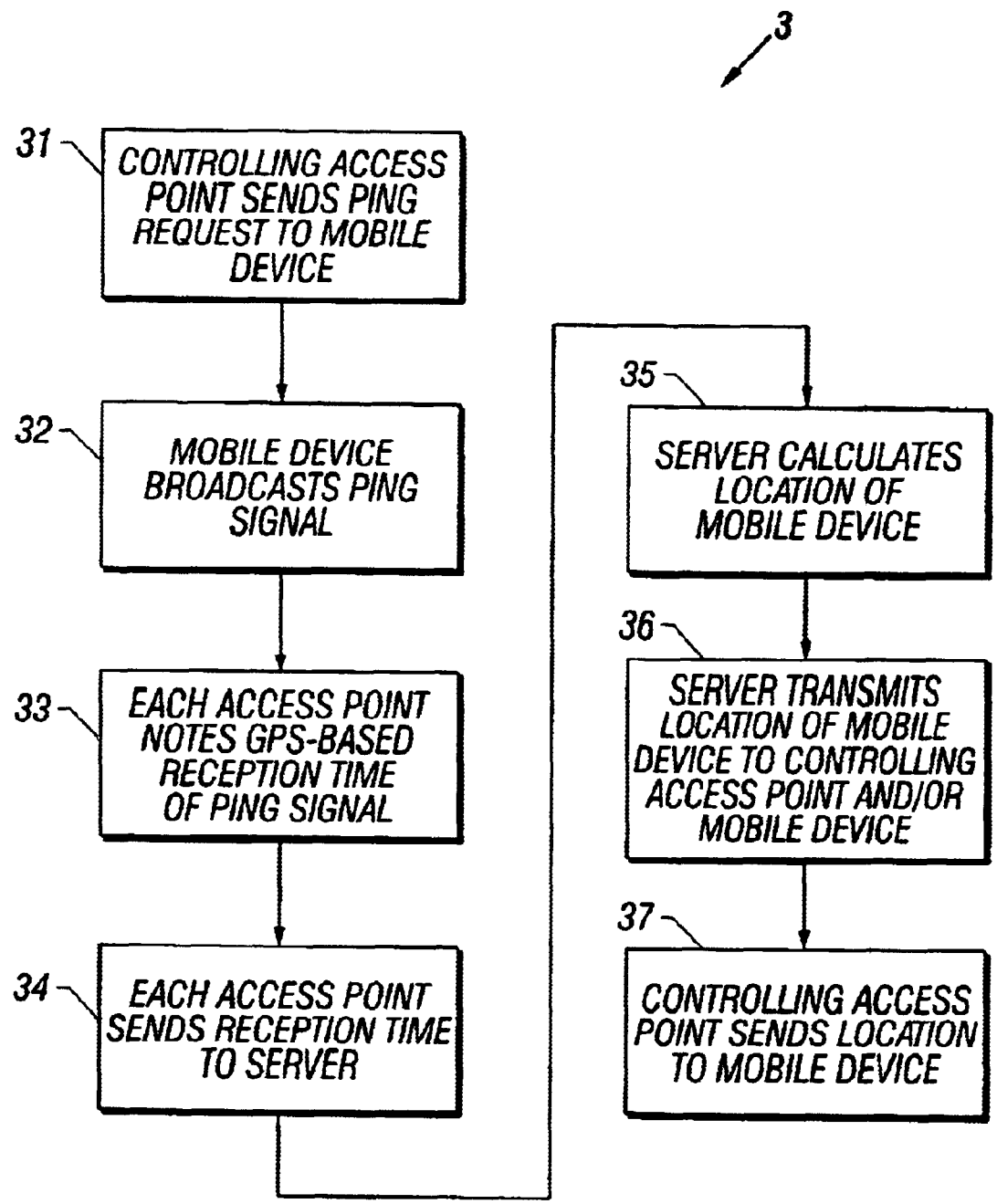
FIG. 3 shows a flow chart of a method embodiment at a system level.

FIG. 3 shows a flow chart 3 of a method embodiment at the system level. At block 31, the controlling access point, i.e., the access point that is currently handling data communications with the wireless mobile device, may send a ping request to the mobile device. A ping request is a request for the mobile device to broadcast a ping signal. In one embodiment, this request is first received by the wireless access point from a server, and the request is then passed on to the mobile device. In another embodiment, a ping request originates in the access point and is transmitted to the mobile device at regular intervals.

At block 32, in response to the ping request, the mobile device may broadcast a ping signal. At block 33, each relevant access point may receive the ping signal and note the reception time, i.e., a value representing the time at which the signal was received as indicated by the access point's internal synchronized clock. Relevant access points may be defined as those access points that are able to receive the ping signal and that are designated to receive it. In one embodiment, all access points that are able to receive the ping signal are considered relevant. In another embodiment, only particular access points (such as three specific access points designated to be used in the triangulation calculations) are considered relevant.

At block 34, multiple access points may transmit data to a server. The data may include not only the previously noted time value, but may also include an identification of the mobile device and an identification and/or location of the access point making the transmission. The access points may transmit their information over a network using the technology and protocols appropriate for that network.

At block 35, the server may receive the various time values and calculate the location of the mobile device, based on the ping reception times and the location of each access point. With known triangulation techniques, the location of the mobile device may be accurately determined with information from only three access points.

Once the location of the mobile device is known to the server, various uses may be made of that information. In the illustrated embodiment of FIG. 3, the server may transmit the location information back to the controlling access point at block 36, and the controlling access point may transmit that information to the mobile device at block 37 for presentation to the user or for other use by the mobile device. If the access point and mobile device do not have any direct use for this information, block 36 may be skipped.

The server may have other uses, not shown in FIG. 3, for the location information. For example, the server may store the location and access it when the user of the mobile device makes a request to the server for location-specific information such as where the nearest vending machine is located. The server may also initiate unrequested information to the mobile device to proactively inform the user of services available in the user's vicinity.

Figure 4:
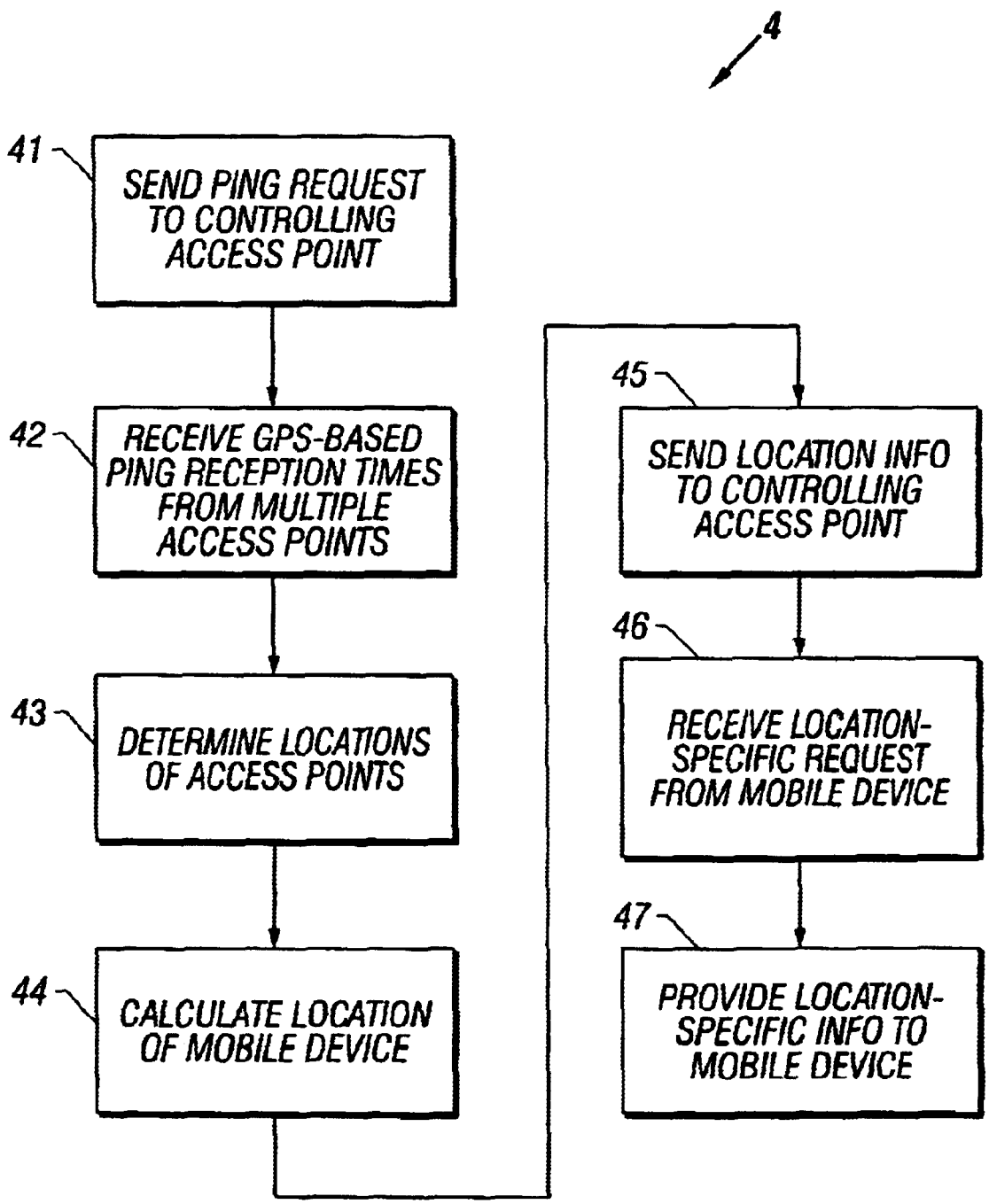
FIG. 4 shows a flow chart of a method embodiment at a server level.

FIG. 4 shows a flow chart 4 of a method embodiment that may be implemented in a server. At block 41, the server may send a ping request to a controlling access point, along with identification of which mobile device the access point should forward the ping request to. Outside of the server (not shown), the controlling access point may forward that request to the designated mobile device, which may respond by broadcasting a ping signal to the multiple access points within its broadcast range. Those access points may note their reception times of that ping signal, format those reception times into time values, and send those time values to the server.

At block 42, the server may receive the time values representing the reception times from the access points. In one embodiment, the time information from each access point may be included in one or more packets that also include an identification of the mobile device and an identification of the access point initiating the transmission. The server may determine the locations of the associated access points at block 43. In one embodiment, this determination includes receiving that information in the packet. In another embodiment, that information may be in a database accessible to the server. At block 44, the server may calculate the location of the designated mobile device with triangulation algorithms that consider the difference in receptions times for each access point and the physical location of each access point. These calculations may determine the location of the mobile device in three-dimensional space, provided the three-dimensional locations of the access points are known. The location of the mobile device may be translated into any useful coordinate system.

In block 45, the calculated location may be sent to the controlling access point. This may or may not be the same access point that was controlling when the ping request was sent, since the designation of 'controlling' access point may be dynamically changed for various operational reasons. Block 45 may be eliminated in some embodiments, if the mobile device and/or access points do not have use for the coordinates of the mobile device's location.

At block 46, the server may receive a communication from the mobile device, through the controlling access point, requesting information that is specific to the mobile device's location. At block 47, the requested information may be transmitted from the server to the mobile device through the controlling access point. As an example, the user of the mobile device may request the location of the nearest vending machine. The server may use the previously calculated location of the mobile device and a stored database of the location of vending machines to determine which vending machine is closest to the user. This information may then be transmitted to the mobile device, where it may be displayed to the user. Directions on how to reach the vending machine may also be included. In this example, it is not necessary for the mobile device to know its own location, since all the relevant information resides in the server and only the final answer need be sent to the mobile device.

Figure 5:
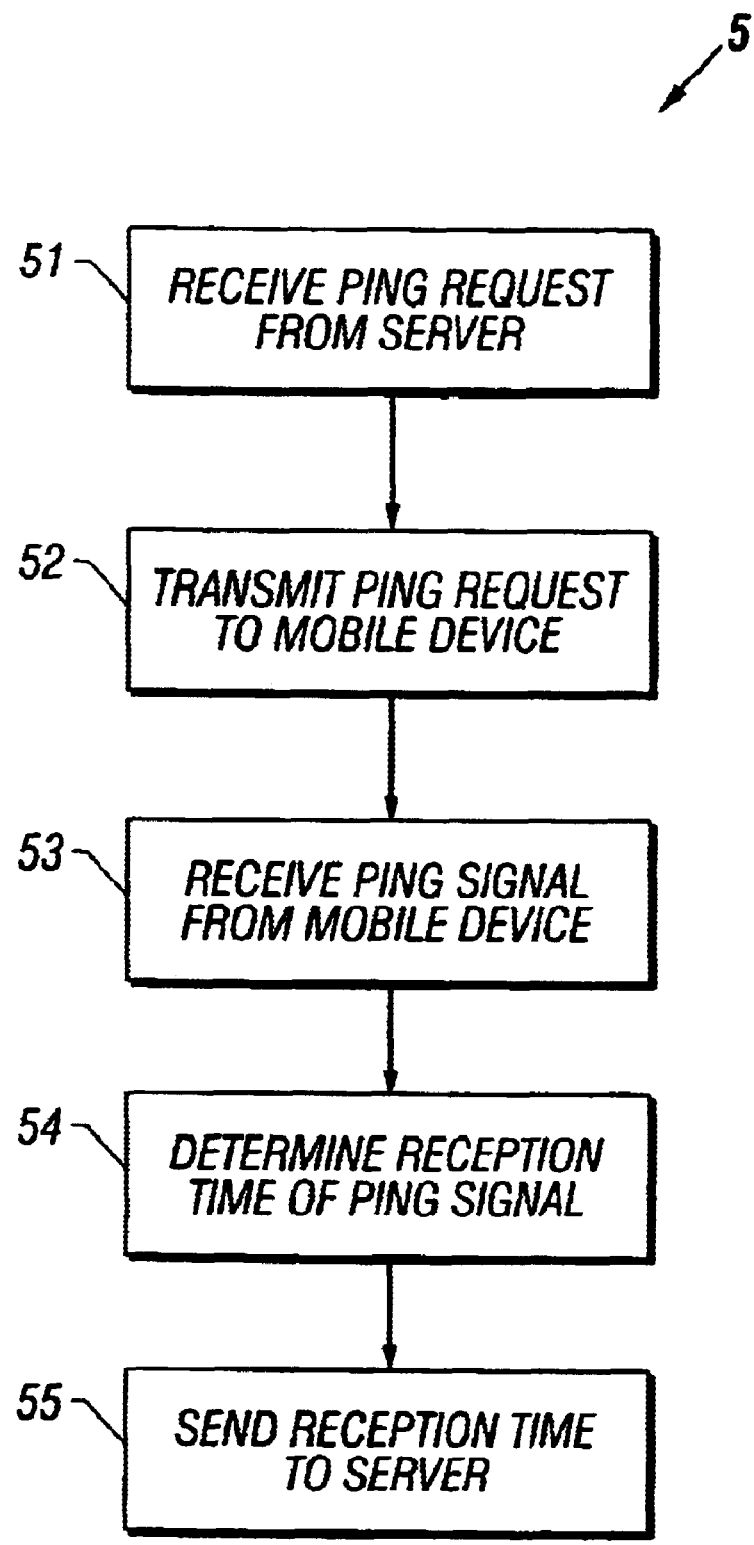
FIG. 5 shows a flow chart of a method embodiment at an access point level.

FIG. 5 shows a flow chart 5 of a method embodiment that may be implemented in an access point. At block 51, a ping request may be received from a server. The ping request may be addressed to a specific mobile device, and at block 52 the ping request may be forwarded to the addressed mobile device. In one embodiment, blocks 51 and 52 may be performed only in the controlling access point for the addressed mobile device. Outside the access point (not shown), the addressed mobile device may respond to the request by broadcasting ping signal, which may be received by all access points within range. At block 53, the ping signal may be received by the access point, which may note the reception time of the ping signal. In one embodiment, the reception time is determined with respect to an internal clock that is synchronized with the internal clocks of the other access points in the vicinity. At block 55, the reception time may be transmitted to a server in the form of a time value. This time value may be in any convenient form or format. In one embodiment, the reception time may be transmitted in response to a request from the server to provide the access time. This transmission may include an identification of the mobile device associated with the ping signal. In one embodiment, the transmission may also include coordinates of the location of the access point.

Blocks 53–55 may also be performed by other access points that received the ping signal, so that the server will have at least three time values from three access points with which to perform triangulation calculations.

Another embodiment of system 1 as shown in FIG. 1 may use pseudo-GPS signals for triangulation. In the pseudo-GPS operation, each access point 12–14 may convert the received GPS satellite signals to a different radio band for transmission to mobile device 10. Mobile device 10 may then calculate its own location by triangulating on the access points, using the difference in timing of the pseudo-GPS signals received from each access point. The calculated location may then be transmitted to the controlling access point, which may forward that data to a server. Pseudo-GPS signals may be modulated to minimize multi-path problems. In the pseudo-GPS operation, there may be no need for a ping request or a ping signal, as the pseudo-GPS signals may be transmitted repeatedly. The various access points that are transmitting pseudo-GPS signals to the mobile device may use time division multiplexing, different frequencies, or other schemes to avoid interference with the multiple signals received at the mobile device.

In one embodiment, the pseudo-GPS signals are transmitted from the same access points that can provide data communication with the mobile device. In another embodiment, the pseudo-GPS transmitters are separate from the access points that communicate data to/from the mobile device, and may have different locations that are used in the triangulation calculations. These pseudo-GPS transmitters may obtain their own location information by triangulating on the standard GPS signals received from GPS satellites.

Figure 6:
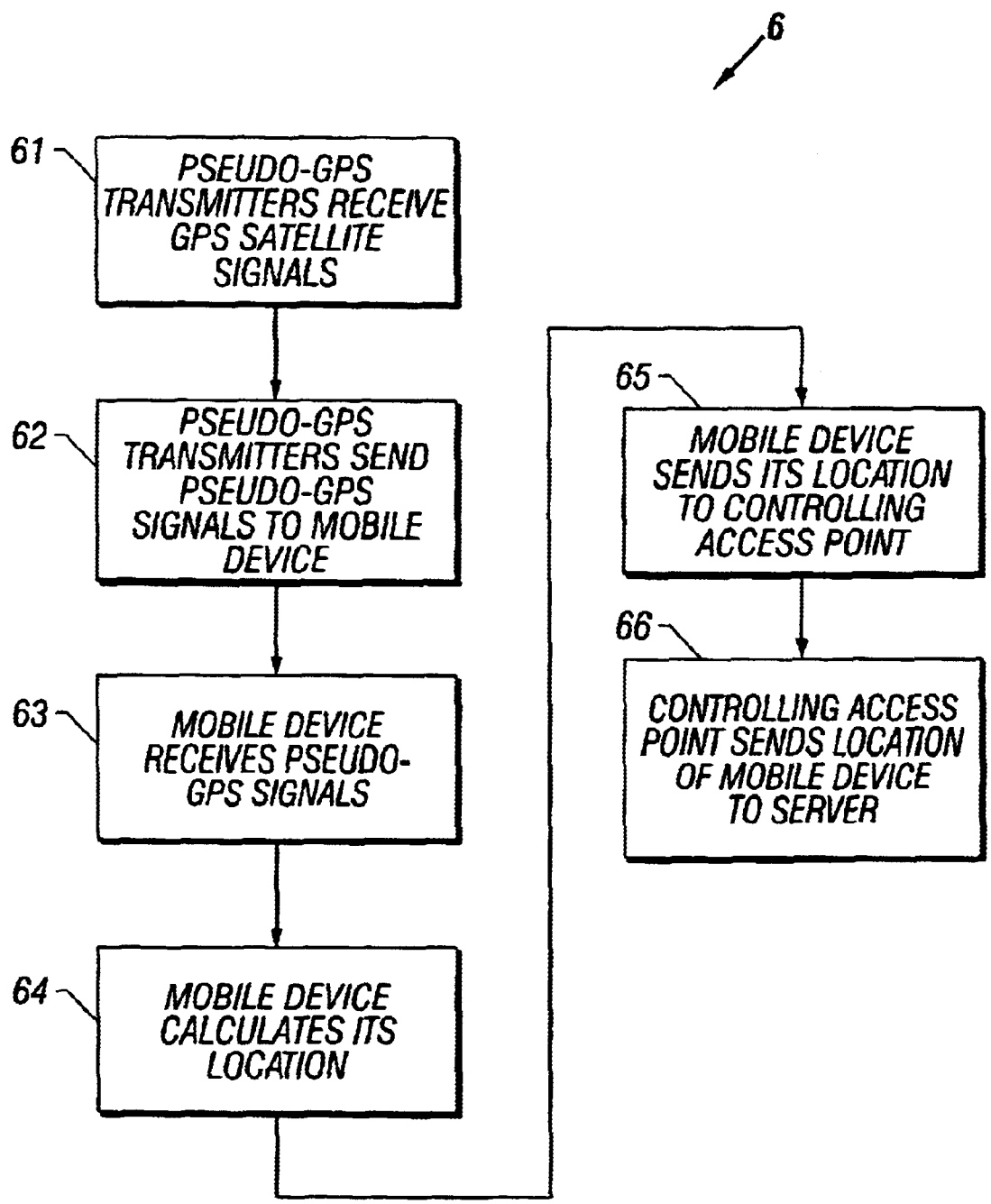
FIG. 6 shows a flow chart of a method embodiment of a pseudo-GPS implementation.

FIG. 6 shows a flow chart 6 of a method embodiment that may be implemented in a system. At block 61, the pseudo-GPS transmitters receive GPS satellite signals. In one embodiment, each pseudo-GPS transmitter calculates its own location from these received GPS satellite signals. At block 62, each pseudo-GPS transmitter transmits pseudo-GPS signals, which may be received by any mobile device within range. As previously stated, the various transmitters may use time-division multiplexing, different frequencies, or other schemes to avoid interfering with each other. In one embodiment, the pseudo-GPS transmitters are integrated into the access points. In another embodiment, they are separate devices. Each pseudo-GPS transmitter may also transmit its own location so that the mobile device will have the necessary information to perform triangulation calculations.

At block 63, the mobile device may receive the pseudo-GPS signals from multiple pseudo-GPS transmitters, and at block 64, may calculate its own position based on the relative reception times of these signals and on the location of each pseudo-GPS transmitter. At block 64, the mobile device may send its location information to the controlling access point, which may forward that information to a server at block 66.

In the pseudo-GPS embodiment, multiple mobile devices may receive the same transmitted pseudo-GPS signals from multiple pseudo-GPS transmitters, and each mobile device may make its own calculation of its own location. Each mobile device may then transmit its location to its respective controlling access point using the normal communications protocols established for the system.

The invention can be implemented in circuitry or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A system, comprising:

first, second and third wireless access points, each to include synchronized time information derived from a common time base and an interface to transmit digital data to a wireless mobile device and to receive digital data and a ping signal from the wireless mobile device; and a processing device coupled to the first, second and third wireless access points through communications links to receive data on when the ping signal was received at each of the first, second and third wireless access points and to derive positional information on the wireless mobile device from the data.

2. The system of claim 1, wherein:

the common time base is derived from a satellite-based global position system.

3. The system of claim 1, wherein:

the ping signal is to be transmitted simultaneously to each of the first, second, and third wireless access points.

4. The system of claim 1, wherein:

the processing device is to derive positional information by using triangulation techniques based on the data from the first, second and third wireless access points.

5. The system of claim 1, wherein:

the wireless mobile device includes an Internet browser.

6. The system of claim 1, wherein:

the interface comprises a common antenna for said transmitting the digital data and for said receiving the ping signal.

7. The system of claim 1, wherein:

the ping signal includes a signal reference point.

8. A method, comprising:

receiving a ping signal and data communications from a wireless mobile device through a same interface;

determining a time value representing when the ping signal was received based on a clock synchronized with clocks in other apparatuses; and transmitting the time value to a computer system that receives other time values from the other apparatuses and calculates a physical location of the wireless mobile device.

9. The method of claim 8, further comprising:

transmitting a ping request to the wireless mobile device.

10. The method of claim 8, further comprising:

receiving the physical location of the wireless mobile device from the computer system.

11. The method of claim 10, further comprising:

transmitting the physical location of the wireless mobile device to the wireless mobile device.

12. A machine-readable medium, having instructions stored thereon for execution by at least one processor, said instructions capable of directing the at least one processor to perform operations comprising:

receiving a ping signal and data communications from a wireless mobile device through a same interface;

determining a time value representing when the ping signal was received based on a clock synchronized with clocks in other apparatuses; and transmitting the time value to a computer system that receives other time values from the other apparatuses and calculates a location of the wireless mobile device.

13. The medium of claim 12, further comprising:
transmitting a ping request to the wireless mobile device.

14. The medium of claim 12, further comprising:
receiving the location of the wireless mobile device from the computer system.

15. The medium of claim 14, further comprising:
transmitting the location of the wireless mobile device to the wireless mode device.

16. An apparatus comprising:
a first interface to receive a ping signal and data communications from a wireless mobile device;
circuitry to determine a time value representing when the ping signal was received based on a clock synchronized with clocks in other apparatuses; and
a second interface to transmit the time value to a computer system to calculate a physical location of the wireless mobile device.

17. The apparatus of claim 16, wherein:
the first interface is to transmit a ping request to the wireless mobile device.

18. The apparatus of claim 16, wherein:
the second interface is to receive the physical location of the wireless mobile device from the computer system.

19. The apparatus of claim 16, wherein:
the first interface is to transmit the physical location of the wireless mobile device to the wireless mobile device.

20. A system, comprising:
a plurality of wires access points, each to include synchronized time information derived from a common time base and an interface to transmit digital data to a wireless mobile device and to receive digital data and a ping signal from the wireless mobile device; and
a processing device coupled to each of the plurality of wireless access points through communications links to receive data on when the ping signal was received at each of the plurality of wireless access points and to derive positional information on the wireless mobile device from the data.

21. The system of claim 20, wherein:
the ping signal is to be transmitted simultaneously to each of the plurality of wireless access points.

22. The system of claim 20, wherein:
the processing device is to derive positional information based on the data from the first, second and third wireless access points.

23. The system of claim 20, wherein:
the wireless mobile device includes an Internet browser.

* * * * *